United States Patent
Goldman et al.

(10) Patent No.: US 7,643,909 B2
(45) Date of Patent: Jan. 5, 2010

(54) HIGHLY RESPONSIVE MASTER-SLAVE VALVE POSITIONING

(75) Inventors: David J. Goldman, North Andover, MA (US); Martin Ryan, Reading, MA (US); Vladislav Davidkovich, Stoneham, MA (US); Gordon Hill, Arlington, MA (US)

(73) Assignee: MKS Instruments, Inc., Wilmington, MA (US)

( * ) Notice: Subject to any disclaimer, the term of this patent is extended or adjusted under 35 U.S.C. 154(b) by 189 days.

(21) Appl. No.: 11/278,071

(22) Filed: Mar. 30, 2006

(65) Prior Publication Data

US 2007/0235668 A1 Oct. 11, 2007

(51) Int. Cl.
*G06F 19/00* (2006.01)
(52) U.S. Cl. .................................. 700/282; 251/30.05
(58) Field of Classification Search ............... 700/282, 700/281; 251/30.05; 137/624.1
See application file for complete search history.

(56) References Cited

U.S. PATENT DOCUMENTS

2005/0279404 A1\* 12/2005 Brown .......................... 137/2
2006/0113249 A1\* 6/2006 Childers et al. ............. 210/645

OTHER PUBLICATIONS

Written Opinion for corresponding PCT Appln: PCT/US2007/05663, 5 pp.
International Search Report for corresponding PCT Appln: PCT/US2007/05663, 2 pp.

\* cited by examiner

*Primary Examiner*—Kidest Bahta
(74) *Attorney, Agent, or Firm*—McDermott Will & Emery, LLP

(57) ABSTRACT

A master valve and at least one slave valve are connected via a network, wherein upon broadcast of a position setpoint of the master valve the at least one slave valve achieves a corresponding position within a shortened period of time, such network being a dedicated network or high speed shared network with position setpoint priority.

29 Claims, 3 Drawing Sheets

HIGHLY RESPONSIVE MASTER-SLAVE VALVE POSITIONING

FIELD OF INTEREST

The present inventive concepts relate to the field of system and methods for administering control signals among a set of master and slave devices. More particularly, the present invention relates to systems and methods for controlling master and slave valves in a highly responsive manner.

BACKGROUND

A variety of systems implement master and slave (or master/slave) valves to control, for example, pressure in a chamber. In such systems the slave valves follow the lead of the master valve. As such, the slave valves are intended to be responsive to movement of the master valve. It is often a goal of such systems that the master and slave valves operate in concert, and as close to simultaneously as possible.

The difference in time between the movement of the master valve and the movement of the slave vales is referred to as the response time. To achieve near simultaneous operation between the master and slave valves, response time should be minimized. Because communication between the master valve and slave valves occurs via a communication path and the slave valves need to each process and respond to a master valve position signal (sometimes referred to as the setpoint), certain challenges to minimizing response times exist.

In a typical valve system, the position of the master valve has been embodied in an analog signal (e.g., 0-10 Volts) communicated to the slave valves via a copper path. An analog communication method is fast, but it is susceptible to noise. To achieve accuracy noise should be removed, if not eliminated. In reality, it is difficult to achieve high resolution without utilizing heavy low-pass filters to reduce the noise. Use of low-pass filters can, however, increase the response time. Also, since the analog pressure setpoint is converted into a digital signal by an analog-to-digital ("A/D") converter at the slave valve, digitizing the noise (i.e., the least significant bit (LSB) of the word) can create an undesired jittering of the position of the slave valves.

In an analog implementation, even 1 LSB jitter in the gate or flapper position of a slave valve can produce significant mechanical vibration that is undesired in many pressure control applications. A pressure transducer is typically used to provide pressure feedback to a pressure controller that is used for controlling the valves. Mechanical feedback can occur, where the pressure transducer that provides the pressure feedback signal responds to the mechanical vibrations. The pressure controller will respond to this signal from the pressure transducer, which will lead to pressure control instability. When there are many slave devices, this unwanted mechanical motion will be more pronounced, which is more likely to cause unwanted pressure control disturbances. Thus, achieving accurate and stable valve control in a highly responsive system provides myriad interrelated challenges.

SUMMARY OF INVENTION

The present inventive concepts relate to a method of controlling multiple valves. The method comprises coupling a master valve and a set of slave valves via a digital network. The master valve receives a pressure setpoint value representing a desired pressure and a feedback pressure value representing an actual pressure and then positions a master valve gate of the master valve as a function of the pressure setpoint value and the pressure feedback value. The method further includes generating a position setpoint representing a relative position of the master valve gate within a range of master valve gate positions and broadcasting the position setpoint over the digital network. Finally, the method includes positioning a gate of each slave valve in the set of slave valves to a position corresponding to the relative position of the master valve gate. The term "gate" as used herein is meant in its broadest sense with respect to a variety of types of valves; its meaning includes an actuator (e.g., mechanical actuator, electro-mechanical actuator and the like) that restricts flow in any of a variety of types of valves, such as, for example, pendulum valves, butterfly valves, and gate valves.

In accordance with another aspect of the invention, a valve control system includes a digital network coupling a master valve and a set of slave valves. A controller is configured for generating instructions for positioning a master valve gate of the master valve, the instructions are generated as a function of a pressure setpoint value representing a desired pressure within the chamber and a pressure feedback value representing an actual pressure within the chamber. A master valve is configured for generating a position setpoint message representing a relative position of the master valve gate within a range of master valve gate positions. And a position setpoint transmitter is configured for broadcasting the position setpoint message to the set of slave valves over the network, wherein each slave valve in the set of slave valves includes a slave valve gate and is configured for positioning the slave valve gate to a position corresponding to the relative position of the master valve gate.

In accordance with another aspect of the invention, a valve control system includes multiple valves useful in controlling pressure in a chamber. The system comprises a master valve and a set of slave valves coupled via a digital network. A controller is coupled to the master valve and configured for generating instructions for positioning a master valve gate of the master valve as a function of a pressure setpoint value representing a desired pressure in the chamber and a pressure feedback value representing an actual pressure in the chamber. And a position setpoint transmitter is configured for broadcasting a digital position setpoint over the network to the set of slave valves, wherein the position setpoint embodies a relative position of the master valve gate within a range of master valve gate positions, and each slave valve in the set of slave valves includes a slave valve gate that is moved to a position corresponding to the relative position of the master valve gate.

In accordance with yet another aspect of the invention, a valve control system includes multiple valves useful in controlling pressure in a chamber. A master valve and a set of slave valves may be coupled via a dedicated digital network, wherein the network may be configured to prevent communication with the master valve and the set of slave valves over the network by other devices. A controller may be coupled to the master valve and configured for generating instructions for positioning a master valve gate of the master valve as a function of a pressure setpoint value representing a desired pressure in the chamber and a pressure feedback value representing an actual pressure in the chamber. And a position setpoint transmitter may be configured for broadcasting a digital position setpoint over the network to the set of slave valves, wherein the position setpoint embodies a relative position of the master valve gate within a range of master valve gate positions, and each slave valve in the set of slave valves includes a slave valve gate that is moved to a position corresponding to the relative position of the master valve gate in response to receipt of the position setpoint.

In such methods and systems may be implemented and configured such that, for example, the positioning of each gate of each slave valve does not lag behind the positioning of the master valve gate by more than about 20 ms.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF PREFERRED EMBODIMENT

A system and method in accordance with the disclosed illustrative embodiments enable decreased response time for slave valves by providing improved communication, handling, or both of the position setpoint of the corresponding master valve. As an example, in a situation where multiple valves are needed to control the pressure of a vacuum chamber at least one valve is designated as the master valve and others may be designated as slave valves. A controller in communication with the master valve controls pressure in the vacuum chamber using a feedback signal from a pressure transducer. The master valve communicates a position setpoint to the slave valves and the slave valves position themselves using the position setpoint—with as little time delay as possible. The result is, preferably, that the master valve and slave valves are all positioned at the position setpoint. In the pressure controlled vacuum chamber system of the present illustrative embodiments, response time will preferably not be more than about 20 milliseconds (ms), and preferably not more than about 10 ms. As an example, in some circumstances response times of about 3 ms or less have been achieved. In other embodiments different response time thresholds may be appropriate; the present invention is, therefore, not limited to the foregoing illustrative response times. The term "gate" as used herein is meant in its broadest sense with respect to a variety of types of valves; its meaning includes an actuator (e.g., mechanical actuator, electro-mechanical actuator and the like) that restricts flow in any of a variety of types of valves, such as, for example, pendulum valves, butterfly valves, and gate valves.

Beyond the issue of decreasing response time, are the issues of improving accuracy and minimizing noise for each slave valve. Better resolution of the position setpoint enables better accuracy of the slave valve placement. In typical prior art systems, the position setpoint is communicated as an analog signal. Since such analog signals are susceptible to noise, they require low-pass filtering. In contrast, a digital communication system, such as those disclosed herein, enable substantially noise free performance at the fastest possible rates, without the need for low-pass filtering of the position setpoint signal between the master valve and slave valves. In the preferred form, the position setpoint is, therefore, communicated as a digital signal, preferably having 16 bit resolution or better. But the resolution requirements may differ in different systems, so the resolution is not confined to 16 bit in other embodiments.

Figure 1:
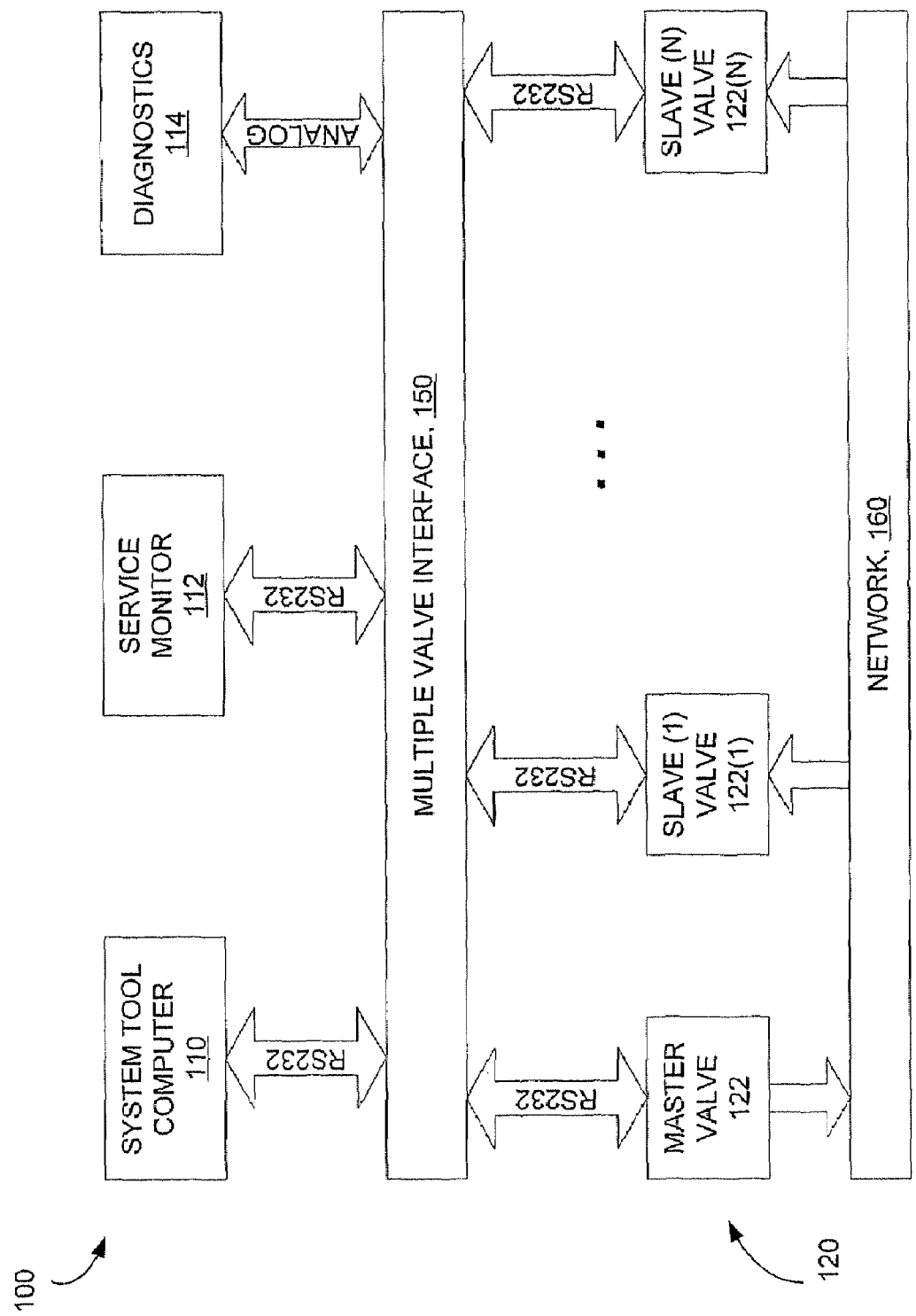
FIG. 1 is a partial top-level block diagram of a pressure controlled vacuum chamber system.

FIG. 1 is a partial block diagram of a pressure controlled vacuum chamber system 100 employing multiple valve system 120, wherein pressure inside a vacuum chamber (not shown) is controlled by a set of valves. Valve system 120 comprises a master valve 122 and at least one slave valve, represented by a plurality of slave valves 122(1)-122(N). In this embodiment, a system tool computer 110 represents a functional module responsible for operating and managing the valve system 120, and does so via a multiple valve interface 150. The multiple valve interface 150 may be any multiple valve interface known in the art. A service monitor 112 is primarily responsible for monitoring pressure in the chamber, and may take the form of a computer program executable by a computing device, such as a workstation or personal computer. And diagnostics module 114 runs typical diagnostic routines to determine the health and status of the valves or other system components, and may also take the form of a computer program running on a commercially available computing device. One or more of these devices may be configured for determining the required pressure to be achieved or maintained in the pressure chamber (a pressure setpoint) and may also be configured for sensing the pressure within the pressure chamber. Since the forgoing devices 110, 112, and 114 are generally known in the art, they are not discussed in detail herein.

In this embodiment, a multi-network approach is used. The system tool computer 110 and service monitor 112 communicate with the multiple valve interface 150 using typical RS232 interfaces and approaches and the diagnostics module 114 communicates with the multiple valve interface 150 using a typical analog interface. The multiple valve interface 150 communicates with the set of valves 120 using typical RS232 interfaces. Such multiple valve interfaces are generally known in the art. Other types of substantially equivalent analog or digital interfaces could also be used.

The communication paths and devices used in monitoring and adjusting the pressure within the pressure chamber may be referred to as a "pressure control loop." Unlike typical pressure controlled vacuum chamber systems, in this embodiment the position setpoint is not communicated to the slave valves via network 150. Rather, a dedicated network 160 is used for providing positioning information to the slave valves of valve system 120. In this embodiment, network 160 takes the form of a dedicated control area network (CAN). Network 160 is dedicated to handling position setpoint communications among the valves of the valve system 120, without traffic from other devices. Accordingly, the valve system 120, including network 160, forms a critical, highly responsive portion of the pressure control loop. Independently, the system tool 110, service monitor 112, and diagnostics module 114 communicate with the valve system 120 via the multiple valve interface 150 for typical supervisory and housekeeping purposes, and not via network 160. Thus the housekeeping and supervisory functions and communications are separated from the position setpoint functions and communications.

In a different embodiment, the master-slave housekeeping and supervisory functions and communications and the position setpoint functions and communications take place on the same wire (or network), although still isolated from other communications. In this embodiment, the position setpoint communications are prioritized over the housekeeping and supervisory communications. As a result, the housekeeping and supervisory functions and communications do not substantially compromise or interfere with the master-slave valve response times.

In other embodiments, if a network had sufficient speed to meet the response time requirements of the pressure controlled vacuum chamber system, while also handling the message traffic of the other devices, then perhaps a single network could be used instead of using both of networks 150 and 160. For example, the message traffic of network 150 and network 160 could coexist or be merged into a single network and meet the response time requirement (e.g., 10 ms) of this embodiment if the network was, for example, a standard 100 MB/sec or higher Ethernet network, or other network of similar performance. Whether or not the network speed is sufficient to use a single network is a function of the response time requirements and other traffic with which such a network would be shared, and may also be a function of the communication protocol used. In any embodiment where the network is shared such that communications other than position setpoint communication takes place on the network, preferably the position setpoint communications are prioritized to meet the target or required response time.

Returning to FIG. 1 and the illustrative embodiment, the master valve 122 broadcasts its position setpoint to the slave valves 122(1)-122(n) in digital form via dedicated network 160. As mentioned above, in this embodiment the position setpoint message is broadcast as a 16-bit word, which significantly eliminates noise that is typical in analog signals. The slave valves do not need to be individually addressed in this embodiment—because, other than the master valve 122, the slave valves are the only connected devices on network 160 and they are all intended to receive the same position setpoint message from the master valve 122. Since network 160 is implemented as a dedicated network, traffic from other system devices does not occur on network 160, so does not need to be managed. The protocol scheme for network 160, therefore, need not use addressing or priority handling. Thus, the broadcast setpoint position message is efficiently received and processed by each slave valve 122(1)-122(N), without the overhead associated with processing address information or analyzing and handling traffic in accordance with a related protocol priority scheme. Additionally, since the system tool computer 110, service monitor 112, and diagnostics module 114 communicate with the valves 120 via multiple valve interface 150, and not over network 160, there is no chance of delays to the slave valves 122(1)-122(N) caused by user or process generated interrupts from such devices.

Figure 2:
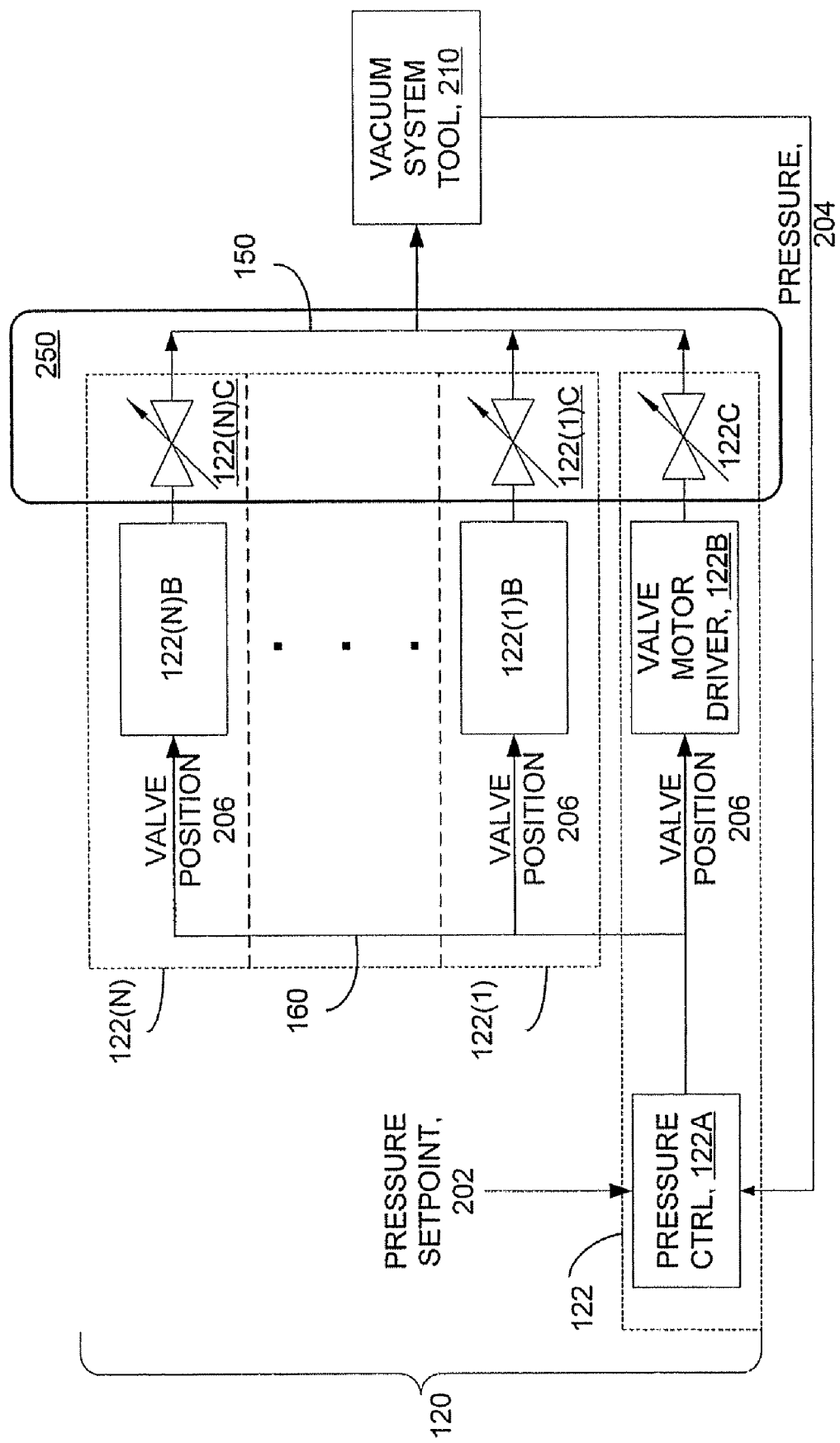
FIG. 2 is a block diagram of a valve system that may form part of the pressure controlled vacuum chamber system of FIG. 1.
Figure 3:
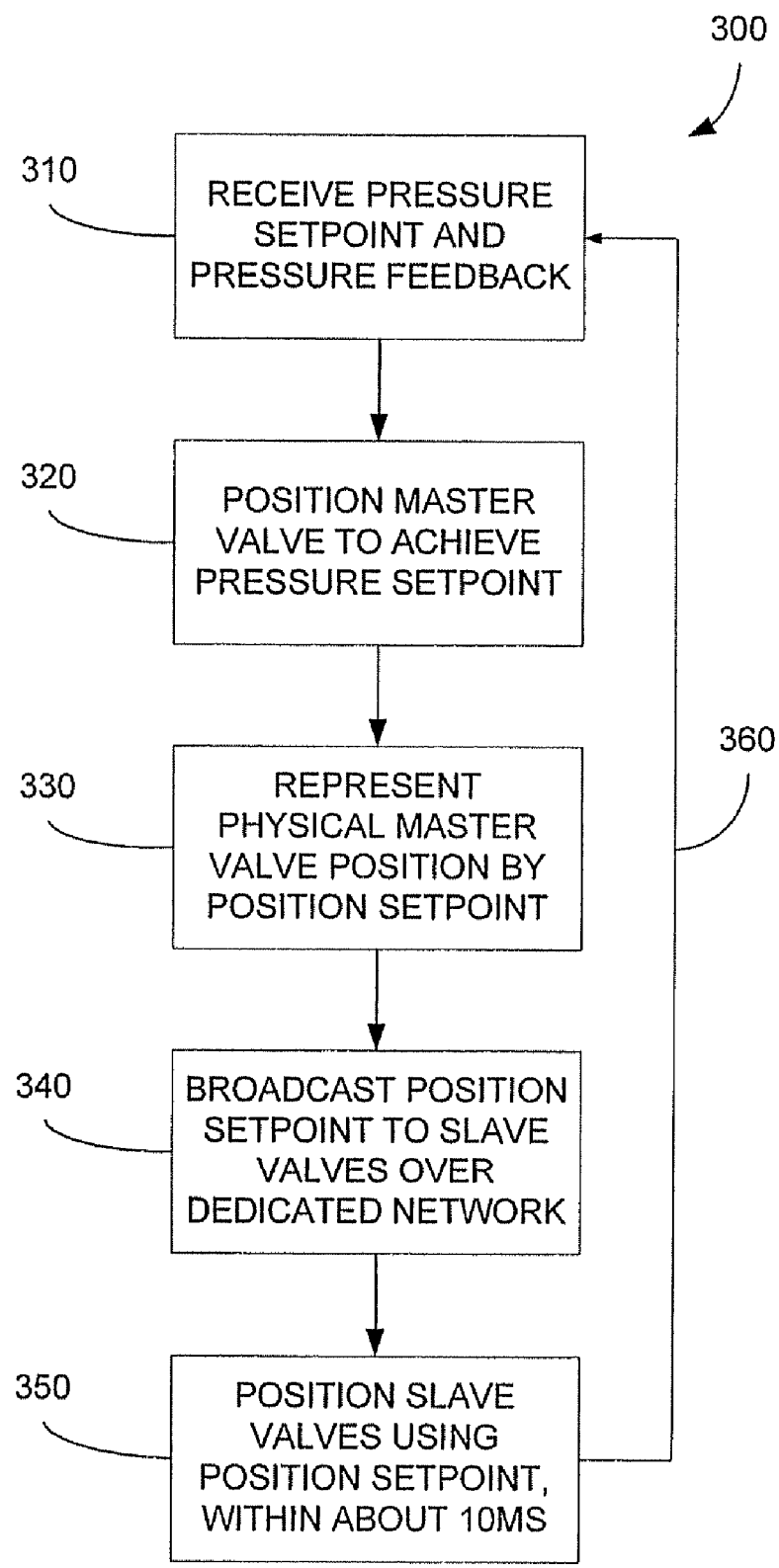
FIG. 3 is a flowchart depicting a method of controlling a set of valves that may be implemented in the valve system of FIG. 2.

FIG. 2 includes a more detailed block diagram of valve system 120, as implemented in the pressure controlled vacuum chamber system of FIG. 1, for controlling pressure in a vacuum chamber 250. And FIG. 3 is a flowchart 300 that provides a method of achieving a response time of at least about 10 ms, such as with the system of FIG. 2. As in FIG. 1, the valve system 120 includes master valve 122 and slave valves 122(1)-122(N). The valve system 120 is configured to achieve an improved response time, e.g., on the order of about 10 ms or less. In this embodiment the master valve 122 includes a pressure controller 122A, which provides position (or control) instructions to a valve motor driver 122B. The valve motor driver physically positions a corresponding valve gate or flapper (each referred to herein as the "gate") 122C to a position, referred to as the position setpoint.

Pressure controller 122A receives two messages as inputs from which it generates and communicates a valve position message 206 to valve motor driver 122B; this is depicted as step 310 in FIG. 3. One of the two inputs is a pressure setpoint 202 message, which represents a desired or required pressure for chamber 250. That is, pressure setpoint 202 represents the pressure that must be achieved or maintained within chamber 250. The other input is a feedback pressure signal 204 indicating the actual pressure within chamber 250. The pressure signal 204 is provided by a vacuum system tool 210, which may take the form of a pressure transducer coupled to pressure sensors of the chamber 250, for example disposed at or integral with the valves of the valve system 120. The vacuum system tool 210, pressure controller 122A and valves 122, 122(1)-122(N) form part of the pressure control loop. As a function of the pressure setpoint message 202 and pressure signal 204, the pressure controller 122A instructs the valve motor driver 122B to position of the valve gate 122C to achieve the desired pressure setpoint, as indicated by step 320 of FIG. 3. The physical position of the valve gate 122C is represented by a valve position message 206, as indicated by step 330 of FIG. 3. The valve gate position may be determined by the sensors at or integral with the valve.

The pressure inside chamber 250 is a function of the physical positions of the valves 122(C), 122(1)C-122(N)C, wherein the valves are used to control the pressure by selectively releasing fluids, for example, from pressure chamber 250. Like master valve 122, each slave valve 122(1)-122(N) includes a valve motor driver 122(1)B-122(N)B and a valve gate 122(1)C-122(N)C. Each of the valves is calibrated so its range of physical positions is known. The position setpoint indicates a percentage or number of step increments within the range that each valve gate should be physically positioned (or opened). As an example, if a valve has a range of 1,500 increments between its fully opened and fully closed positions, then a position setpoint of 80% would indicated that the valve should be opened 300 increments.

In valve system 120 herein, the same setpoint would be applied to each valve. In this embodiment, the position setpoint of master valve 122 is broadcast over digital network 160 to all slave valves 122(1)-122(N), preferably without the overhead of addressing or priority schemes, and without sharing the network with valve related housekeeping or supervisory communications. This is depicted as step 340 of FIG. 3. The valve driver motors 122(1)B-122(N)B of the slave valves 122(1)-122(N) receive the broadcast valve position setpoint message 206 and immediately drive the valve gates 122(1)C-122(N)C to positions within their respective ranges that correspond to the digital position setpoint—in concert with the master valve. In this embodiment, all slave valves achieve the position setpoint within about 10 ms or less of the master slave achieving its position, as is shown in step 350 of FIG. 3. The pressure control loop is maintained during operation of the pressure controlled vacuum chamber system, and continually monitors and positions the valves of the valve system 120 as needed to achieve or maintain the desired pressure within the chamber 250, as shown by arrow 360 of FIG. 3.

In one embodiment of a network implementation of the pressure controlled vacuum chamber system, each master/slave may be configured as a "node" within network 160, such as a CAN. In the above illustrative embodiment, where each valve is not addressed, the master valve 122 and each slave valve 122(1)-122(N) powers up unconfigured, without the normal MAC ID filtering and without the normal duplicate MAC ID check. The actual MAC ID value is not relevant in this protocol since there is no MAC ID filtering. In one embodiment, assuming there are other non-master/slave valve devices on the network, an approach may be provided within the protocol to prevent accidental connection to those non-master/slave devices. That is, communication with and among such devices is preferably prevented on the network (e.g., network 160) when the pressure controlled vacuum chamber system is powered up. To prevent accidental connection to such devices, the master or any unconfigured nodes will be configured to respond to any duplicate MAC ID request. This effectively eliminates the potential to establish connections with other devices during power up, so locks out any non-master/slave devices gracefully, without interrupting operation and without allowing unrelated data traffic on the network.

As in the above embodiments, the network 160 may be a CAN comprising hardware typically used for DeviceNet networking, which is known in the art—particularly in industrial applications utilizing master/slave devices. Using the DeviceNet protocol, the position setpoint may be embodied in a packet. All slave valves 122(1)-122(N) receive the broadcast message, and are configured to apply the position setpoint contained in the packet, as discussed above with respect to FIG. 2 and FIG. 3.

The packet may use a CAN Group 2 message identifier and comprises only two data bytes. The first byte is the low byte of the 16 bit integer position setpoint. The second byte is the high byte of the setpoint. In this embodiment, messages of any length other than the expected two data bytes are assumed not part of this protocol and discarded by the slave devices. No CAN messages are accepted by masters or unconfigured nodes (e.g., not yet commanded as a master or slave) with the exception of duplicate MAC ID check messages, which are used to configure them.

One valve may be configured as master valve and the others as slave valves. A valve may be configured as a slave valve by loading it with the appropriate firmware, for example, as is known in the art. However, if such a valve receives the appropriate Set Master Mode (SMM) command, the device operates as an intelligent pressure controller valve, such as master valve 122. In this embodiment the master valve 122 is configured to send out position setpoint messages 206 at regular intervals. As an example, in the illustrative embodiment master valve 122 sends out a CAN message with a position setpoint every 10 ms.

Similarly, a valve may be configured as a slave valve using a serial SMM command, such as slave valves 122(1)-122(N). Once configured, a slave valve operates in a position control mode, responsive to broadcast CAN position setpoint messages received from the master valve 122. As noted above, in this embodiment typical CAN MAC ID filtering is not needed or used, so all slaves "hear" the same broadcast message and all get the same setpoint within milliseconds of each other. The message transmissions and receptions are faster than the RS-232 equivalents and do not require individual addressing of each slave device. The cables may be standard equipment for DeviceNet, which are capable of greater signal travel than is possible with typical RS-232 networks.

Prior art systems typically used an RS-232 network setup to handle supervisory functions and state functions. If the position control information were transmitted over the same network used for supervisory functions, the position control messages could be displaced by supervisory commands or status queries from the user—which increases response time. For optimal control, in this embodiment, it is important that the position commands be communicated and received in a regular and periodic manner. Having a dedicated communication protocol and network for handling the position information that is distinct from other communication traffic (including unplanned messages generated by a user or process) is a distinct advantage in such embodiments.

As mentioned above, an alternative implementations and embodiments would use one high speed network, such as an Ethernet network, for both supervisory functions and position control communications. In this implementation, the network would preferably be implemented with a quality of service (QOS) switch, or another similar method to ensure that the packets containing the position control information had the highest priority. The position control packets would have to be successfully transmitted and received on a regular, periodic interval, while the supervisory and diagnostic packets would be lower priority.

In other embodiments, again speed permitting, wireless networks could be used to provide a network for communication of the position setpoint messages. As will be appreciated by those skilled in the art, various embodiments could take a variety of forms and these forms may change over time as technology advances and greater transmission speeds are capable in various types or forms of networks or network devices.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A method of controlling multiple valves, the method comprising:
   A. coupling a master valve and a set of slave valves via a digital network;
   B. the master valve receiving a pressure setpoint value representing a desired pressure and a feedback pressure value representing an actual pressure;
   C. positioning a master valve gate of the master valve as a function of the pressure setpoint value and the pressure feedback value;
   D. generating a position setpoint representing a relative position of the master valve gate within a range of master valve gate positions;
   E. broadcasting the position setpoint to the set of slave valves over the digital network; and
   F. receiving the position setpoint and positioning a gate of each slave valve in the set of slave valves to a position corresponding to the relative position of the master valve gate.

2. The method of claim 1 comprising controlling pressure in a vacuum chamber with the multiple valves.

3. The method of claim 1 wherein at least a portion of the network comprises a wireless transmission path.

4. The method of claim 1 wherein the network is a controller area network free of data traffic unrelated to the multiple valves.

5. The method of claim 1, wherein the digital network is configured to service master-slave housekeeping, supervisory and position setpoint communications and the method includes prioritizing the position setpoint communications over the housekeeping and supervisory communications.

6. The method of claim 1 wherein the network is a high speed network configured for transmission speeds of about 100 MB/sec or more.

7. The method of claim 1 wherein the network is shared with non-master/slave devices and is also configured for prioritizing transmission of the position setpoint.

8. The method of claim 1 wherein the positioning of each gate of each slave valve does not lag behind the positioning of the master valve actuator by more than about 20 ms.

9. The method of claim 1 wherein the positioning of each gate of each slave valve does not lag behind the positioning of the master valve gate by more than about 10 ms.

10. The method of claim 1 wherein the position setpoint is represented by a 16-bit word.

11. The method of claim 1 wherein one or more slave valves in the set of slave valves does not require a network device address.

12. The method as in claim 1 wherein the generating and broadcasting of the position setpoint is substantially periodic.

13. The method of claim 1 wherein the network is configured to prevent connection to and communication with the master valve and the set of slave valves by other devices on the network.

14. A valve control system comprising:
   A. a digital network coupling a master valve and a set of slave valves;
   B. a controller configured for generating instructions for positioning a master valve gate of the master valve, the instructions generated as a function of a pressure setpoint value representing a desired pressure within the chamber and a pressure feedback value representing an actual pressure within the chamber;
   C. a master valve position sensor configured for generating a position setpoint message representing a relative position of the master valve gate within a range of master valve gate positions; and
   D. a position setpoint transmitter configured for broadcasting the position setpoint message to the set of slave valves over the network, wherein each slave valve in the set of slave valves includes a slave valve gate and is configured for positioning the slave valve gate to a position corresponding to the relative position of the master valve gate, wherein the positioning of each gate of each slave valve does not lag behind the positioning of the master valve gate by more than about 20 ms.

15. The system of claim 14 wherein the multiple valves are configured for controlling pressure in a vacuum chamber.

16. The system of claim 14 wherein at least a portion of the network comprises a wireless transmission path.

17. The system of claim 14 wherein the network comprises a dedicated controller area network, free of data traffic unrelated to the multiple valves.

18. The system of claim 14 wherein the digital network is configured to service master-slave housekeeping, supervisory and position setpoint communications and to prioritize the position setpoint communications over the housekeeping and supervisory communications.

19. The system of claim 14 wherein the network is a high speed network configured for transmission speeds of about 100 MB/sec or more.

20. The system of claim 14 wherein the network is shared with non-master/slave devices and is also configured to prioritize transmission of the position setpoint to achieve the positioning of each slave valve gate within 20 ms.

21. The system of claim 14 wherein the network is shared with non-master/slave devices and is also configured to prioritize transmission of the position setpoint to achieve the positioning of each slave valve gate within 10 ms.

22. The system of claim 14 wherein the positioning of each actuator of each slave valve does not lag behind the positioning of the master valve gate by more than about 10 ms.

23. The system of claim 14 wherein the position setpoint is represented by a 16-bit word.

24. The system of claim 14 wherein one or more slave valves in the set of slave valves does not require a network device address.

25. The system of claim 13 wherein valve control system is configured for periodically generating and broadcasting the position setpoint.

26. The system of claim 14 wherein the network is configured to prevent connection to and communication with the master valve and the set of slave valves by other devices on the network.

27. A valve control system, including multiple valves useful in controlling pressure in a chamber, the system comprising:
   A. a master valve and a set of slave valves coupled via a digital network;
   B. a controller coupled to the master valve and configured for generating instructions for positioning a master valve gate of the master valve as a function of a pressure setpoint value representing a desired pressure in the chamber and a pressure feedback value representing an actual pressure in the chamber; and
   C. a position setpoint transmitter configured for broadcasting a digital position setpoint over the network to the set of slave valves, wherein the position setpoint embodies a relative position of the master valve gate within a range of master valve actuator positions, and each slave valve in the set of slave valves includes a slave valve gate that is moved to a position corresponding to the relative position of the master valve gate, and wherein the positioning of each gate of each slave valve does not lag behind the positioning of the master valve gate by more than about 20 ms.

28. A valve control system, including multiple valves useful in controlling pressure in a chamber, the system comprising:
   A. a master valve and the set of slave valves coupled via a dedicated digital network, wherein the network is configured to prevent communication with the master valve and the set of slave valves over the network by other devices;
   B. a controller coupled to the master valve and configured for generating instructions for positioning a master valve gate of the master valve as a function of a pressure setpoint value representing a desired pressure in the chamber and a pressure feedback value representing an actual pressure in the chamber; and
   C. a position setpoint transmitter configured for broadcasting a digital position setpoint over the network to the set of slave valves, wherein the position setpoint embodies a relative position of the master valve gate within a range of master valve actuator positions, and each slave valve in the set of slave valves includes a slave valve gate that is moved to a position corresponding to the relative position of the master valve gate in response to receipt of the position setpoint.

29. The system of claim 28, wherein the positioning of each slave valve gate does not lag the positioning of the master valve gate by more than about 20 ms.

* * * * *

UNITED STATES PATENT AND TRADEMARK OFFICE
CERTIFICATE OF CORRECTION

PATENT NO.      : 7,643,909 B2                          Page 1 of 1
APPLICATION NO. : 11/278071
DATED           : January 5, 2010
INVENTOR(S)     : Goldman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this

Sixteenth Day of November, 2010

David J. Kappos
*Director of the United States Patent and Trademark Office*